(12) United States Patent
Guen

(10) Patent No.: US 9,570,719 B2
(45) Date of Patent: Feb. 14, 2017

(54) SECONDARY BATTERY

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 419 days.

(21) Appl. No.: 14/102,437

(22) Filed: Dec. 10, 2013

(65) Prior Publication Data
US 2014/0349152 A1 Nov. 27, 2014

Related U.S. Application Data

(60) Provisional application No. 61/826,444, filed on May 22, 2013.

(51) Int. Cl.
H01M 2/06 (2006.01)
H01M 10/42 (2006.01)
H01M 2/04 (2006.01)
H01M 2/08 (2006.01)
H01M 2/30 (2006.01)
H01M 10/04 (2006.01)

(52) U.S. Cl.
CPC .............. H01M 2/06 (2013.01); H01M 2/043 (2013.01); H01M 2/08 (2013.01); H01M 2/305 (2013.01); H01M 10/0413 (2013.01); H01M 10/0431 (2013.01); H01M 10/42 (2013.01); H01M 10/4235 (2013.01); H01M 2200/00 (2013.01)

(58) Field of Classification Search
CPC ........ H01M 10/42; H01M 2/043; H01M 2/06; H01M 2/08
See application file for complete search history.

(56) References Cited

U.S. PATENT DOCUMENTS

| 7,029,790 B2 * | 4/2006 | Mizuno | H01M 2/06 429/161 |
| 2003/0134193 A1 * | 7/2003 | Hanafusa | H01M 2/06 429/181 |
| 2007/0202364 A1 * | 8/2007 | Uh | H01M 2/0404 429/7 |
| 2010/0040943 A1 * | 2/2010 | Kim | H01M 2/0426 429/163 |

(Continued)

FOREIGN PATENT DOCUMENTS

| EP | 2 357 686 A1 | 8/2011 |
| EP | 2 393 138 A1 | 12/2011 |

(Continued)

OTHER PUBLICATIONS

EPO Search Report dated Sep. 1, 2014, for corresponding European Patent application 14158194.2, (6 pages).

Primary Examiner — Stewart Fraser
(74) Attorney, Agent, or Firm — Lewis Roca Rothgerber Christie LLP

(57) ABSTRACT

A secondary battery includes an electrode assembly; a case accommodating the electrode assembly; a cap plate sealing the electrode assembly within the case; a terminal plate on the cap plate and electrically connected to the electrode assembly; and an insulation member between and contacting the cap plate and the terminal plate, wherein the insulation member has a peripheral flange that extends away from the terminal plate.

20 Claims, 17 Drawing Sheets

(56) References Cited

U.S. PATENT DOCUMENTS

| | | | | |
|---|---|---|---|---|
| 2011/0081572 A1* | 4/2011 | Byun | ............... | H01M 2/26 429/178 |
| 2011/0200870 A1* | 8/2011 | Kim | ............... | H01M 2/06 429/179 |
| 2011/0300414 A1* | 12/2011 | Baek | ............... | H01M 2/0426 429/7 |
| 2012/0328932 A1* | 12/2012 | Guen | ............... | H01M 2/024 429/179 |

FOREIGN PATENT DOCUMENTS

| JP | 2007-234586 A | 9/2007 |
|---|---|---|
| KR | 10-2000-0014826 A | 3/2000 |
| KR | 10-2010-0021192 A | 2/2010 |

* cited by examiner

SECONDARY BATTERY

CROSS-REFERENCE TO RELATED APPLICATION

This application claims priority to and the benefit of U.S. Provisional Application No. 61/826,444, filed on May 22, 2013 in the U.S. Patent and Trademark Office, the entire content of which is incorporated herein by reference.

BACKGROUND

1. Field

One or more embodiments of the present invention relate to a secondary battery.

2. Description of the Related Art

In general, unlike primary batteries which are not rechargeable, a secondary battery is both dischargeable and rechargeable. A secondary battery is used as an energy source of, for example, a mobile device, an electric vehicle, a hybrid vehicle, an electric bicycle or an uninterruptible power supply (UPS). Based on the type of external device used with the batteries, a single secondary battery may be used or a battery module in which a plurality of batteries are bundled up by electrically connecting the batteries may be used.

SUMMARY

One or more embodiments of the present invention include a secondary battery in which an electric short circuit between different polarities of the secondary battery caused by intruding foreign substances may be prevented.

According to one or more embodiments of the present invention, a secondary battery includes: a cap plate sealing an electrode assembly; a terminal plate disposed on the cap plate and electrically connected to the electrode assembly; an insulation member formed between the cap plate and the terminal plate; and a short circuit preventing portion that is formed on at least one of the terminal plate and the insulation member and prevents an electrical short circuit due to a foreign material intruding between the terminal plate and the cap plate.

For example, the short circuit preventing portion may be formed on the insulation member.

For example, the insulation member may be formed to surround the terminal plate, and the short circuit preventing portion may be formed on an upper surface of the insulation member formed on the outer portion of the terminal plate.

For example, the short circuit preventing portion may include a protrusion upwardly protruding from the upper surface of the insulation member.

For example, the short circuit preventing portion may be formed in the form of a closed loop along a boundary of the insulation member surrounding the terminal plate.

For example, the protrusion of the short circuit preventing portion may protrude up to the same height as the terminal plate.

For example, the short circuit preventing portion may include an inclined upper surface of the insulation member.

For example, the upper surface of the insulation member may be downwardly inclined toward the terminal plate.

For example, the upper surface of the insulation member may be inwardly inclined in order to limit a flow of a foreign material within the terminal plate.

For example, the short circuit preventing portion may be formed in the form of a closed loop along a boundary of the insulation member surrounding the terminal plate.

For example, the short circuit preventing portion may include a stepped side surface of the insulation member.

For example, the side surface of the insulation member may include an upper side portion and a lower side portion, wherein the insulation member may have an overhang structure in which the upper side portion protrudes outwards more than the lower side portion.

For example, the short circuit preventing portion may comprise a first short circuit preventing portion having an inclined upper surface of the insulation member, a second short circuit preventing portion in the form of a protrusion protruding from the upper surface of the insulation member, and a third short circuit preventing portion having a stepped side surface.

For example, the short circuit preventing portion may be formed on the terminal plate. appreciate For example, the short circuit preventing portion may comprise a groove portion formed in the terminal plate.

For example, the short circuit preventing portion may be formed in a boundary area adjacent to the insulation member.

For example, the short circuit preventing portion may comprise a first short circuit preventing portion having a groove portion formed in the terminal plate and a second short circuit preventing portion formed to surround the terminal plate.

For example, the second short circuit preventing portion may include at least one of an inclined upper surface of the insulation member, a protrusion protruding from the upper surface of the insulation member, and a stepped side surface of the insulation member.

According to the embodiments of the present invention, an electric short circuit between different polarities of a secondary battery caused by intrusion of a foreign substance such as salt water may be prevented. For example, in a salt water spray test in which salt water is sprayed on a secondary battery, the salt water dropping on a terminal plate may flow on a cap plate, and accordingly, a short circuit path might be formed from the terminal plate to the cap plate due to ion conduction but a short circuit preventing portion according to the embodiments of the present invention prevents formation of a short circuit path, thereby preventing a short circuit between different polarities and a malfunction of a secondary battery due to this short circuit.

DETAILED DESCRIPTION

Figure 1:
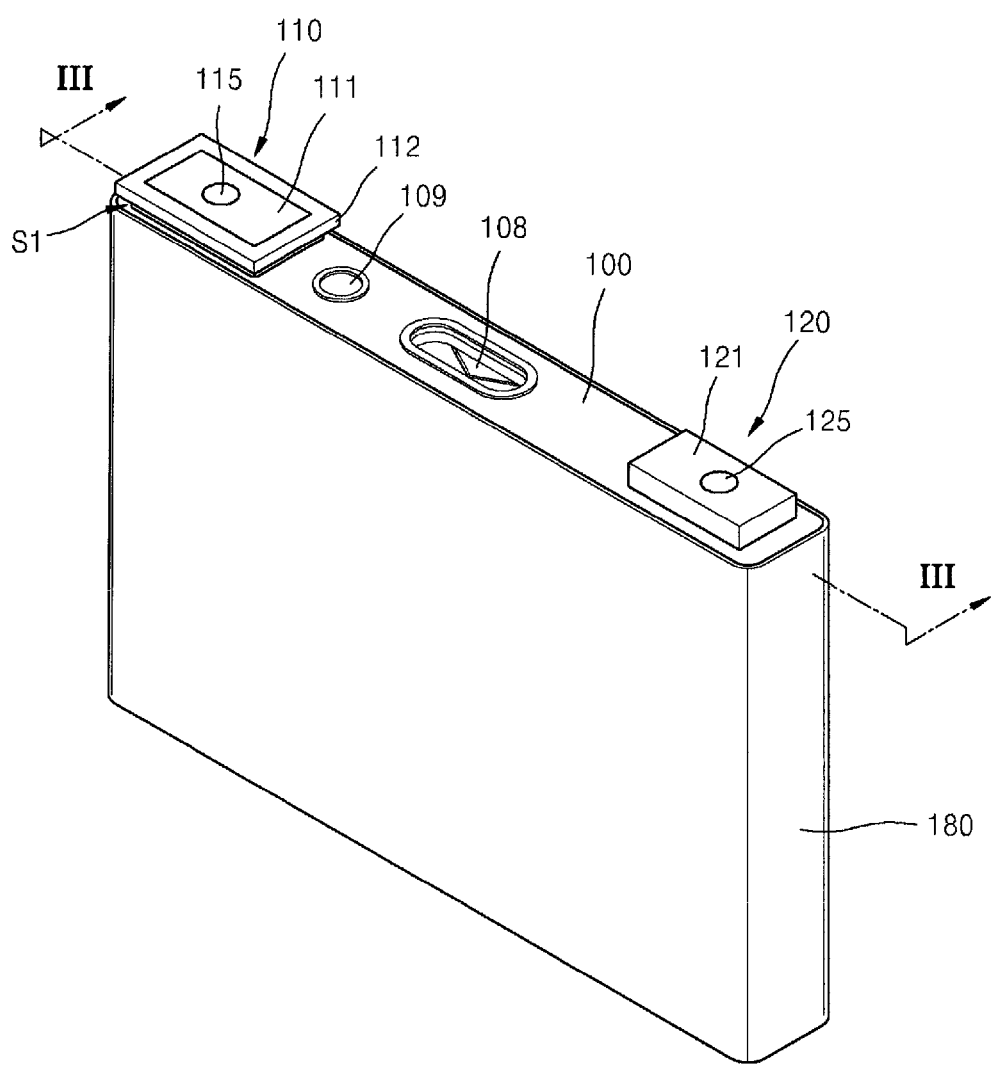
FIG. 1 is a perspective view of a secondary battery according to an embodiment of the present invention.

Reference will now be made in detail to embodiments, examples of which are illustrated in the accompanying drawings, wherein like reference numerals refer to the like elements throughout.

Figure 2:
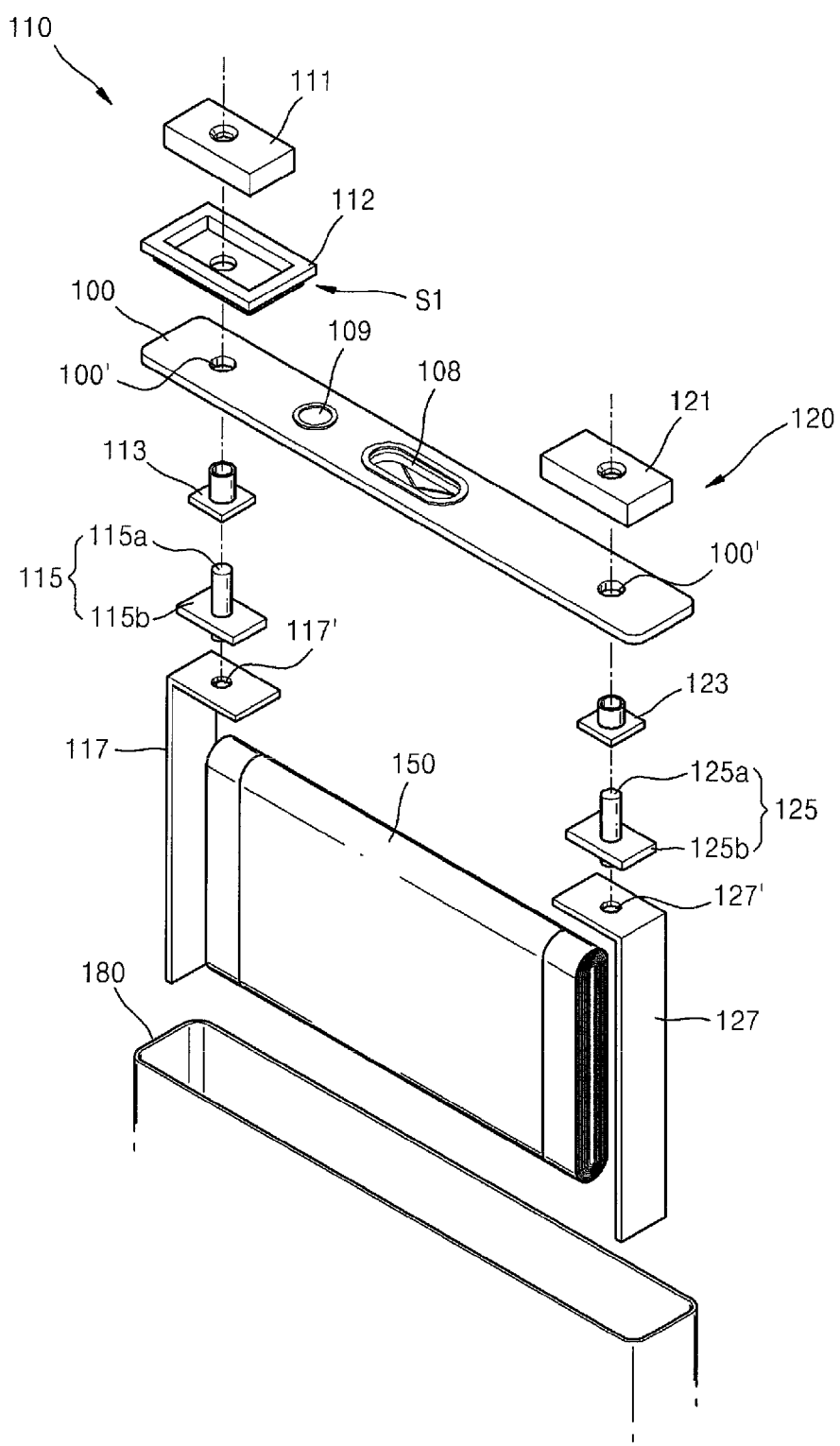
FIG. 2 is an exploded perspective view of the secondary battery illustrated in FIG. 1.

FIG. 1 is a perspective view of a secondary battery according to an embodiment of the present invention. FIG. 2 is a disassembled perspective view of the secondary battery illustrated in FIG. 1.

Referring to FIGS. 1 and 2, a pair of electrode terminals, that is, first and second electrode terminals 110 and 120 which have opposite polarities may protrude from the secondary battery. For example, the first and second electrode terminals 110 and 120 are electrically connected to an electrode assembly 150 accommodated in the secondary battery, and the first and second electrode terminals 110 and 120 are respectively electrically connected to first and second electrode plates of the electrode assembly 150 to thereby supply discharge power accumulated in the secondary battery to the outside or to function as a positive electrode terminal or a negative electrode terminal in order to receive charging power from the outside. For example, the first and second electrode terminals 110 and 120 may be formed on two portions of the secondary battery.

According to another embodiment of the present invention, a cap plate 100 of the secondary battery may be electrically connected to the electrode assembly 150 to function as a terminal, and in this case, one of the first and second electrode terminals 110 and 120 may be omitted.

Figure 3:
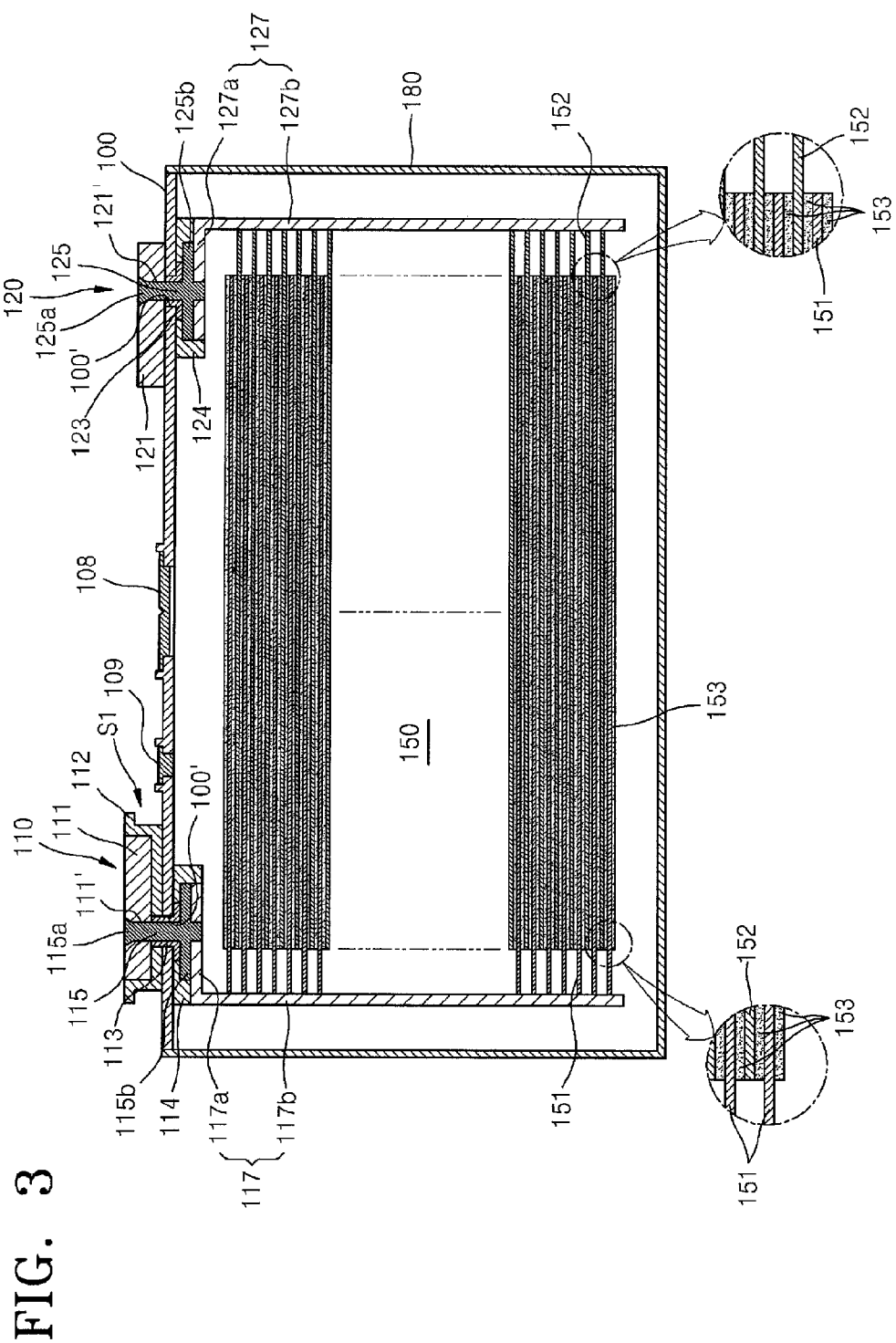
FIG. 3 is a cross-sectional view of the secondary battery of FIG. 1 cut along a line III-III.

FIG. 3 is a cross-sectional view of the secondary battery of FIG. 1 cut along a line III-III according to an embodiment of the present invention. Referring to FIG. 3, the secondary battery includes the electrode assembly 150, the first and second electrode terminals 110 and 120, and collector members 117 and 127 through which the electrode assembly 150 and the first and second electrode terminals 110 and 120 are electrically connected to each other. Also, the secondary battery may include a case 180 accommodating the electrode assembly 150 and the cap plate 100 encapsulating an opening portion of the case 180, in which the electrode assembly 150 is accommodated. The cap plate 100 is coupled to an upper end of the case 180, in which the electrode assembly 150 is accommodated, and may encapsulate the opening portion of the case 180. For example, the cap plate 100 and the case 180 may be coupled to each other via welding along an edge of the cap plate 100.

In one embodiment, the cap plate 100 may include a vent portion 108, which fractures to relieve internal pressure if the internal pressure of the case 180 exceeds a previously set point, and an encapsulation unit 109 that encapsulates an electrolyte solution inlet.

The electrode assembly 150 may be accommodated in the case 180 of the secondary battery, and may include first and second electrode plates 151 and 152 having opposite polarities and a separator 153 located between the first and second electrode plates 151 and 152. The electrode assembly 150 may be a winding type in which the first and second electrode plates 151 and 152 and the separator 153 are wound up in the form of a jelly roll, or a stack type in which the first and second electrode plates 151 and 152 and the separator 153 are alternately stacked. The cap plate 100 may be assembled at an upper opening portion of the case 180, in which the electrode assembly 150 is accommodated, and for electrical connection between the electrode assembly 150 and an external circuit or between the electrode assembly 150 and another adjacent secondary battery, the first and second electrode terminals 110 and 120 that are electrically connected to the electrode assembly 150 may be formed on an outer portion of the cap plate 100.

The first and second terminals 110 and 120 may have different polarities and may be electrically connected to the first electrode plate 151 and the second electrode plate 152 of the electrode assembly 150, respectively.

The first electrode terminal 110 may include a first collector terminal 115 and a first terminal plate 111 coupled to the first collector terminal 115. Similarly, the second electrode terminal 120 may include a second collector terminal 125 and a second terminal plate 121 coupled to the second collector terminal 125. Hereinafter, the collector terminals 115 and 125 may refer both to the first and second collector terminals 115 and 125 or selectively either the first collector terminal 115 or the second collector terminal 125. Also, the terminal plates 111 and 121 may refer both to the first and second terminal plates 111 and 121 or selectively either the first terminal plate 111 or the second terminal plate 121. As will be described later, the first and second collector terminals 115 and 125 are respectively coupled to first and second collector members 117 and 127; the collector members 117 and 127 may refer to both the first and second collector members 117 and 127 or selectively either the first collector member 117 or the second collector member 127.

The first and second collector terminals 115 and 125 may pass through the cap plate 100 to be withdrawn out of the cap plate 100. Accordingly, a terminal hole 100' may be formed in the cap plate 100, into which the collector terminals 115 and 125 are inserted to be assembled. In detail, the first and second collector terminals 115 and 125 are inserted upwardly, in a direction from a lower portion to an upper portion of the cap plate 100, and may be inserted to pass through the terminal hole 100' of the cap plate 100.

The first and second collector terminals 115 and 125 may include first and second collector terminal fixing portions 115a and 125a respectively formed in upper and lower portions of the collector terminals 115 and 125 along a length direction, and may include first and second collector terminal flange portions 115b and 125b. For example, the first and second collector terminals 115 and 125 may be assembled to pass through the cap plate 100, and may include the first and second collector terminal fixing portions 115a and 125a exposed above the cap plate 100 and first and second collector terminal flange portions 115b and 125b located below the cap plate 100.

The first and second collector terminal fixing portions 115a and 125a are included to fix positions of the first and second collector terminals 115 and 125, and may be fixed to upper surfaces of the first and second terminal plates 111 and 121 by using a riveting method. For example, the first and second collector terminal fixing portions 115a and 125a are in a flange form that extend laterally from a main body of the first and second collector terminals 115 and 125, and may be fixed to the upper surfaces of the first and second terminal plates 111 and 121. A groove that is concavely indented according to pressurization of a processing tool which rotates at a high speed may be formed in an upper end portion of the collector terminal fixing portions 115*a* and 125*a*, and as the upper end portion of the collector terminal fixing portions 115*a* and 125*a* are pulled to the side according to pressurization of the processing tool, the first and second collector terminal fixing portions 115*a* and 125*a* may be closely adhered to the upper surfaces of the terminal plates 111 and 121.

The first and second collector terminal flange portions 115*b* and 125*b* may have a flange shape that is extended over an outer diameter of the terminal hole 100' so that the collector terminals 115 and 125 do not disengage from the terminal hole 100' of the cap plate 100. In one embodiment, the collector terminals 115 and 125 are assembled to be inserted into the terminal hole 100' from the lower portion of the cap plate 100, and positions of the collector terminals 115 and 125 may be fixed by riveting the collector terminal fixing portions 115*a* and 125*a* exposed above the cap plate 100 while they are supported under the cap plate 100 via the collector terminal flange portions 115*b* and 125*b*.

The collector terminals 115 and 125 may be inserted into the terminal hole 100' of the cap plate 100 while being electrically insulated from the cap plate 100. For example, first and second seal gaskets 113 and 123 may be inserted into the terminal hole 100', and as the collector terminal 115 and 125 are inserted with the seal gaskets 113 and 123 located between the seal gaskets 113 and 123, the collector terminals 115 and 125 may be insulated from the cap plate 100. The seal gaskets 113 and 123 seal a portion around the terminal hole 100' to prevent leakage of an electrolyte solution contained in the case 180 and seal the case to prevent intrusion of external impurities.

First and second lower insulation members 114 and 124 may be located between the collector terminals 115 and 125 and the cap plate 100; the lower insulation members 114 and 124 may insulate the collector terminals 115 and 125 from the cap plate 100. Thus, by locating the seal gaskets 113 and 123 around the terminal hole 100' through which the collector terminals 115 and 125 pass, and locating the lower insulation members 114 and 124 between the collector terminals 115 and 125 and the cap plate 100, the collector terminals 115 and 125 and the cap plate 100 may be insulated from each other.

In one embodiment, the lower insulation members 114 and 124 may seal the portion around the terminal hole 100', together with the seal gaskets 113 and 123, thereby preventing leakage of an electrolyte solution and intrusion of external impurities. The lower insulation members 114 and 124 may also be extended between the collector members 117 and 127 and the cap plate 100.

The collector terminals 115 and 125 may be electrically connected to the electrode assembly 150 via the collector members 117 and 127. The collector members 117 and 127 may include first and second collector plates 117*b* and 127*b* that comprise a lower portion of the collector members 117 and 127 and are coupled to the electrode assembly 150 and lead portions 117*a* and 127*a* that comprise an upper portion of the collector members 117 and 127 and are coupled to the collector terminals 115 and 125.

The collector plates 117*b* and 127*b* may be coupled to two side edges of the electrode assembly 150, and may be coupled by welding to a non-coated portion formed at an edge of the electrode assembly 150, that is, a non-coated portion of each of the first and second electrode plates 151 and 152 where no electrode active material is formed. For example, the first collector plate 117*b* may be coupled to a non-coated portion of the first electrode plate 151, and the second collector plate 127*b* may be coupled to a non-coated portion of the second electrode plate 152.

The lead portions 117*a* and 127*a* may be portions that are extended from and bent with respect to the collector plates 117*b* and 127*b* so as to face the collector terminals 115 and 125, and terminals holes 117' and 127' may be formed for coupling of the collector terminals 115 and 125 (see FIG. 2). For example, lower end portions of the collector terminals 115 and 125 may be respectively inserted into the terminal holes 117' and 127' of the lead portions 117*a* and 127*a*, and the collector terminals 115 and 125 and the lead portions 117*a* and 127*a* may be assembled to face each other. Also, the collector terminals 115 and 125 and the lead portions 117*a* and 127*a* may be coupled by welding portions around the terminal holes 117' and 127' where they contact each other.

The terminal plates 111 and 121 may be located on the cap plate 100. The terminal plates 111 and 121 are electrically connected to the collector terminals 115 and 125, and may provide a relatively broad terminal area extending over the collector terminals 115 and 125. The terminal plates 111 and 121 may be connected to the collector terminals 115 and 125 (in detail, the collector terminal fixing portions 115*a* and 125*a*) via riveting, but the embodiments of the present invention are not limited thereto; for example, the terminal plates 111 and 121 may be connected to collector terminals by using various methods such as welding or screw coupling.

An insulation member 112 may be located between the first terminal plate 111 and the cap plate 100. The insulation member 112 may insulate the first terminal plate 111 from the cap plate 100.

According to an embodiment of the present invention, one of the first and second terminal plates 111 and 121, for example, the second terminal plate 121, and the cap plate 100 may have the same polarity, and in this case, an insulation member may be omitted between the second terminal plate 121 and the cap plate 100.

According to another embodiment of the present invention, the second terminal plate 121 and the cap plate 100 may have different polarities. For example, the cap plate 100 may have neither a positive polarity nor a negative polarity but may be insulated from both a positive polarity or a negative polarity and be electrically neutral. In one embodiment, in order to insulate the first and second terminal plates 111 and 121 from the cap plate 100, a pair of insulation members surrounding the first and second terminal plates 111 and 121 may be provided.

According to an embodiment of the present invention, a short circuit preventing portion S1 is formed on the insulation member 112 and/or the terminal plate 111. The short circuit preventing portion S1 formed on the insulation member 112 and/or the terminal plate 111 may be selectively formed on one of the insulation member 112 and the terminal plate 111 or both the insulation member 112 and the terminal plate 111.

The short circuit preventing portion S1 may prevent an electrical short circuit between the terminal plate 111 and the cap plate 100, which is caused by foreign materials located between the terminal plate 111 and the cap plate 100. For example, the short circuit preventing portion S1 blocks formation of a short circuit path from the terminal plate 111 to the cap plate 100, thereby preventing an electrical short circuit via the short circuit preventing portion S1 so that no short circuit path is formed due to foreign materials such as salt between the terminal plate 111 and the cap plate 100 having different polarities. For example, in a salt water spray test in which salt water is sprayed on a secondary battery, when salt water dropping on the terminal plate 111 flows onto the cap plate 100, a short circuit path may be formed from the terminal plate 111 onto the cap plate 100 due to ion conduction, and a malfunction may be caused due to electricity flowing between different polarities of the secondary battery.

The short circuit preventing portion S1 may be formed on the terminal plate 111 or the insulation member 112 surrounding a boundary of the terminal plate 111, thereby blocking an electrical short circuit path from the terminal plate 111 to the cap plate 100 due to foreign materials having an electrical conductivity, such as salt water.

For example, when a liquid foreign material flows downward due to gravity, a short circuit path may be formed between the terminal plate 111 and the cap plate 100, and in order to prevent formation of this short circuit path, a short circuit preventing portion S1 in the form of a step for blocking a continuous flow of a foreign material, in the form or a protrusion, or in the form of a groove portion for blocking a flow of a foreign material by accommodating the flow may be formed on the terminal plate 111 or on the insulation member 112 surrounding the boundary of the terminal plate 111. The short circuit preventing portion S1 will be described in detail below.

Figure 4A:
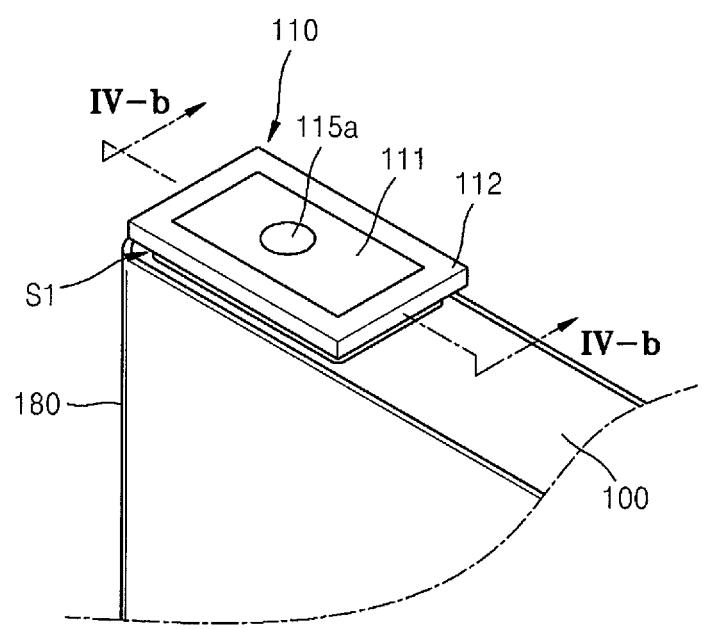
FIGS. 4A and 4B illustrate a portion of a secondary battery including a short circuit preventing portion according to an embodiment of the present invention.
Figure 4B:
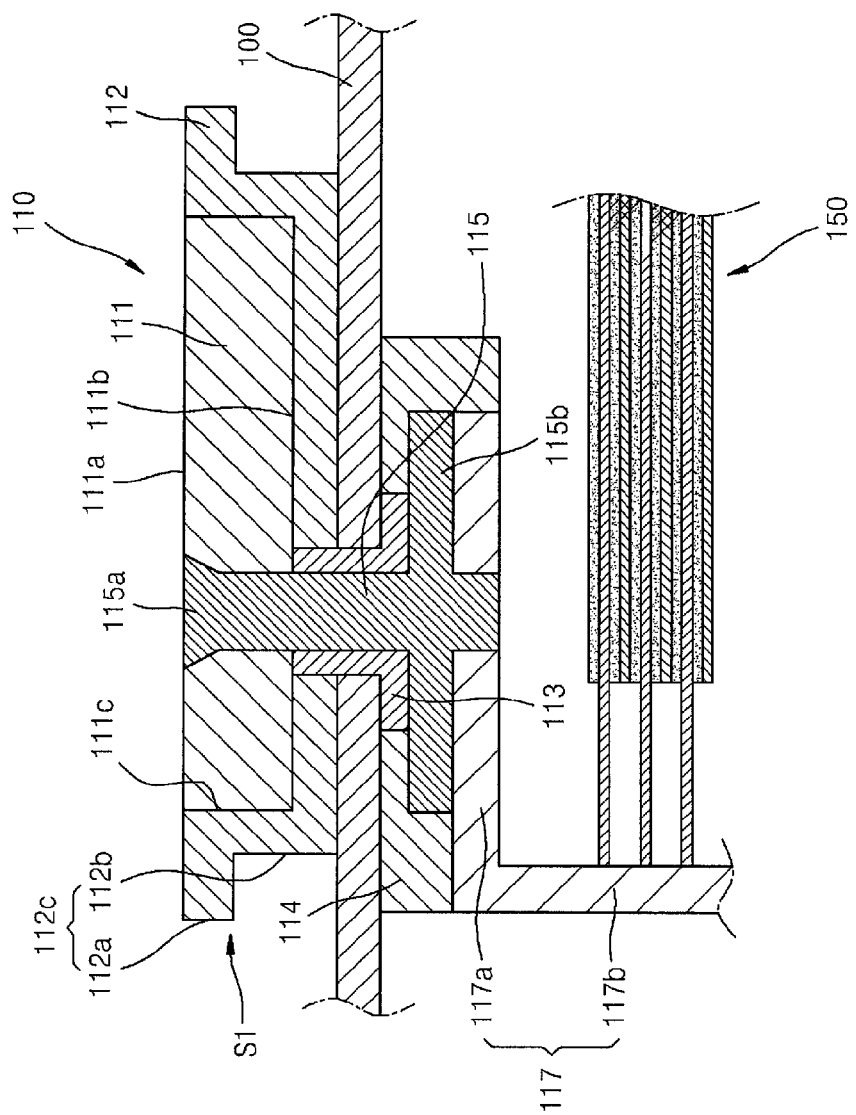

FIGS. 4A and 4B illustrate a short circuit preventing portion S1 according to an embodiment of present invention. FIG. 4B is a cross-sectional view cut along a line IV-b of FIG. 4A.

Referring to FIGS. 4A and 4B, the short circuit preventing portion S1 is formed on the insulation member 112 surrounding the terminal plate 111. In detail, the insulation member 112 surrounds a periphery of the terminal plate 111 from the outside and the short circuit preventing portion S1 in the form of a step may be formed on a side of the insulation member 112.

For example, a side surface 112c of the insulation member 112 is a portion of the insulation member 112 that covers a side 111c of the terminal plate 111, and may be a portion of the insulation member 112 covering the side 111c of the terminal plate that connects an upper surface 111a of the terminal plate 111 exposed to the outside and a lower surface 111b of the terminal plate 111 that faces the cap plate 100.

For example, the short circuit preventing portion S1 may be formed on the external side surface 112c of the insulation member 112 opposite to the terminal plate 111. The short circuit preventing portion S1 may cut off a continuous flow of a foreign material flowing along the external side surface 112c of the insulation member 112, thereby preventing a short circuit between the terminal plate 111 and the cap plate 100.

For example, the short circuit preventing portion S1 may have a step shape between an upper side portion 112a and a lower side portion 112b. For example, the insulation member 112 may have an overhang structure in which the upper side portion 112a protrudes outwards more than the lower side portion 112b. In other words, the short circuit preventing portion S1 in the form of a step may be formed as the upper side portion 112a protrudes outwards in an opposite direction from the terminal plate 111 more than the side lower portion 112b. A liquid foreign material flowing along the upper side portion 112a is not able to flow along the lower side portion 112b which is inwardly stepped, and thus, the continuous liquid flow may be cut.

For example, the short circuit preventing portion S1 may have a closed loop form along the entire side surface 112c of the insulation member 112. Because the short circuit preventing portion S1 surrounds the boundary of the terminal plate 111, the flow of foreign materials flowing from the terminal plate 111 in any direction may be effectively blocked.

Figure 5A:
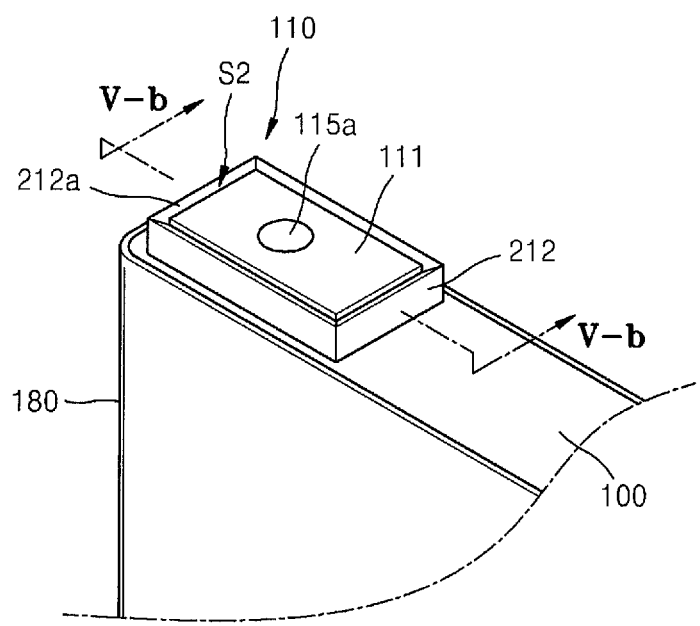
FIGS. 5A and 5B illustrate a portion of a secondary battery including a short circuit preventing portion according to another embodiment of the present invention.
Figure 5B:
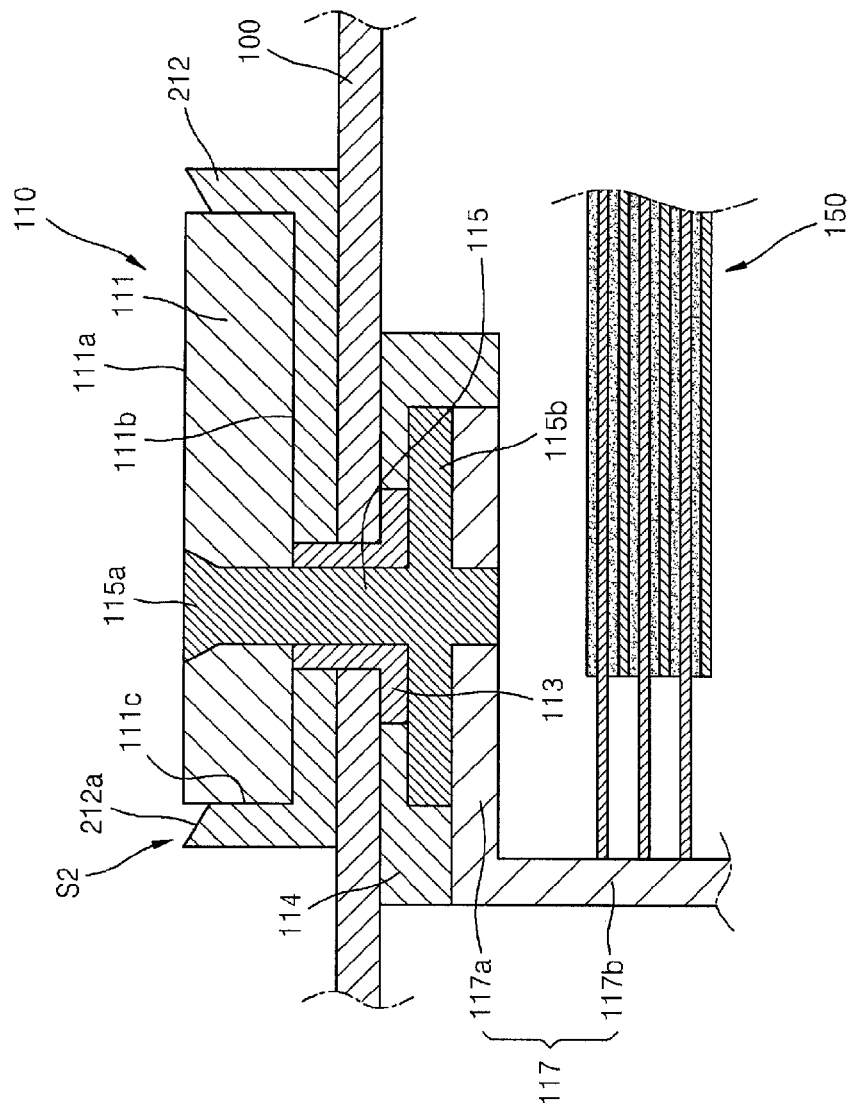

FIGS. 5A and 5B illustrate a short circuit preventing portion S2 according to another embodiment of present invention. FIG. 5B is a cross-sectional view cut along a line V-b of FIG. 5A.

Referring to FIGS. 5A and 5B, the short circuit preventing portion S2 may be formed on an insulation member 212 formed to surround a terminal plate 111. In detail, the insulation member 212 surrounds the terminal plate 111 from the outside, and the short circuit preventing portion S2 may be formed on an upper surface 212a of the insulation member 212 formed on the outer portion of the terminal plate 111. For example, the upper surface 212a of the insulation member 212 may refer to a surface formed on the same side as an upper surface 111a of the terminal plate 111 exposed to the outside.

The short circuit preventing portion S2 may be formed on the upper surface 212a of the insulation member 212, and may have an inclined surface formed on the insulation member 212. For example, the upper surface 212a of the insulation member 212 may be inclined toward an inner portion of the insulation member 212 where the terminal plate 111 is located. That is, the short circuit preventing portion S2 may be downwardly inclined toward the terminal plate 111. Accordingly, a flow of a foreign material on the upper surface 212a of the insulation member 212 flows to the terminal plate 111 but does not flow to the cap plate 100 on an outer portion of the terminal plate 111. Accordingly, the flow of the foreign material may be limited inside the terminal plate 111, and the flow of the foreign material flowing to the cap plate 100 on the outer portion of the terminal plate 111 may be blocked. Consequently, an electrical short circuit between the terminal plate 111 and the cap plate 100 may be prevented.

While the short circuit preventing portion S2 formed of the inclined surface is illustrated as an oblique plane in FIG. 5B, the embodiments of the present invention are not limited thereto; the short circuit preventing portion S2 may also be a round and curved surface.

The short circuit preventing portion S2 may be in the form of a rim along a boundary of the insulation member 212. The short circuit preventing portion S2 may be in the form of a closed loop along the boundary of the insulation member 212 to surround the terminal plate 111, thereby blocking a flow of a foreign material flowing from the upper surface 111a of the terminal plate 111 in any direction.

Figure 6A:
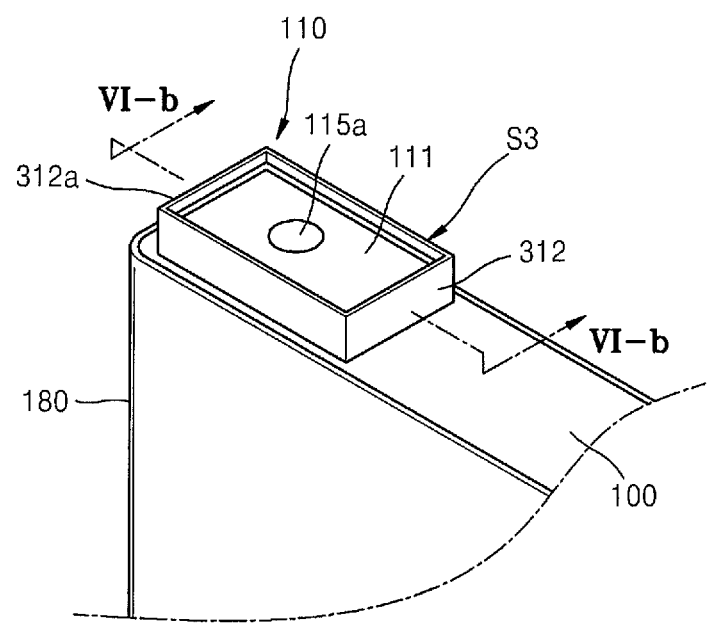
FIGS. 6A and 6B illustrate a portion of a secondary battery including a short circuit preventing portion according to another embodiment of the present invention.
Figure 6B:
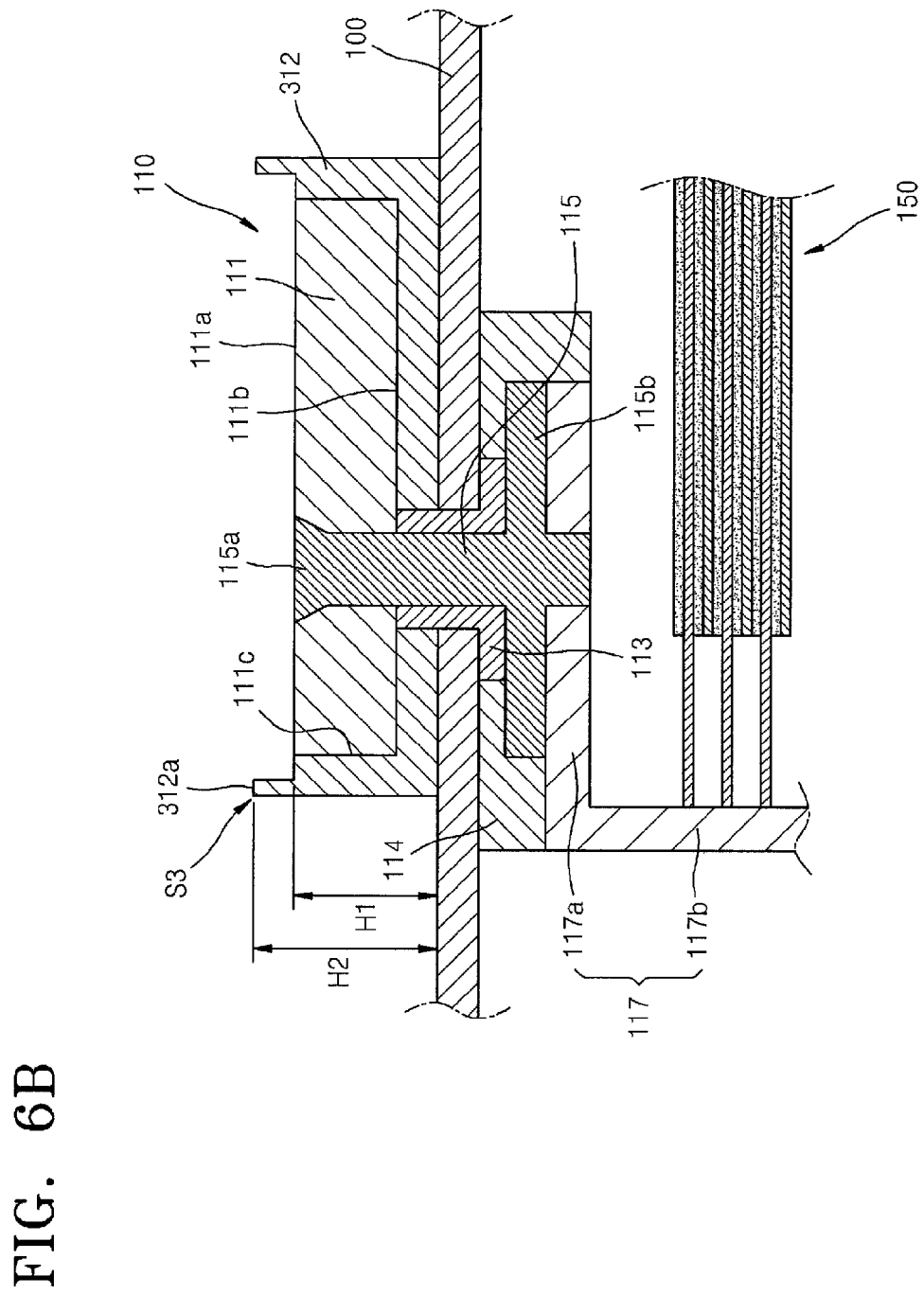

FIGS. 6A and 6B illustrate a short circuit preventing portion S3 according to another embodiment of present invention. FIG. 6B is a cross-sectional view cut along a line VI-b of FIG. 6A.

Referring to FIGS. 6A and 6B, the short circuit preventing portion S3 is formed on an insulation member 312 surrounding a terminal plate 111. In detail, the insulation member 312 surrounds a periphery of the terminal plate 111 from the outside, and the short circuit preventing portion S3 in the form of a protrusion may be formed on an upper surface 312a of the insulation member 312 formed in an outer portion of the terminal plate 111.

For example, an upper surface of the insulation member 312 may refer to a surface formed on the same side as an upper surface 111a of the terminal plate 111 exposed to the outside. The short circuit preventing portion S3 may be formed in the form of a rim along a boundary of the insulation member 312.

The short circuit preventing portion S3 may be formed in the form of a closed loop along the boundary of the insulation member 312 to surround the terminal plate 111, thereby blocking a flow of a foreign material flowing from the upper surface 111a of the terminal plate 111 in any direction.

Because the short circuit preventing portion S3 is formed in the form of a protrusion upwardly protruding from the upper surface 312a of the insulation member 312, a flow of a foreign material flowing from the terminal plate 111 may be blocked, and an electrical short circuit caused due to the flow of the foreign material may be prevented. For example, the short circuit preventing portion S3 may function as a dam that blocks a flow of a foreign material, or even when a foreign material overflows the short circuit preventing portion S3, the short circuit preventing portion S3 in the form of a protrusion cuts the continuous flow of the foreign material, thereby preventing an electrical short circuit caused due to the continuous flow of the foreign material such as salt water.

For example, a protrusion height H2 of the short circuit preventing portion S3 may be the same as a height H1 of the terminal plate 111 or higher. The short circuit preventing portion S3 which is formed at a height equal to or higher than the terminal plate 111 may prevent a liquid foreign material such as salt water from flowing down from the terminal plate 111.

Figure 7A:
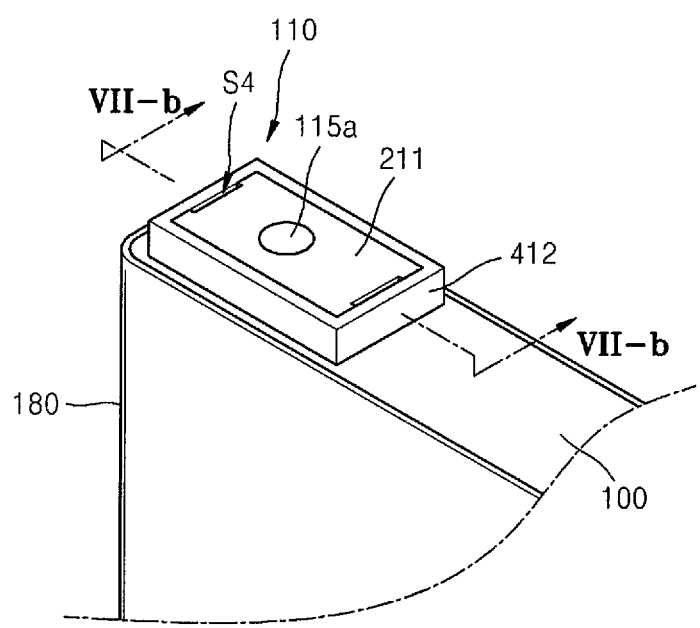
FIGS. 7A and 7B illustrate a portion of a secondary battery including a short circuit preventing portion according to another embodiment of the present invention.
Figure 7B:
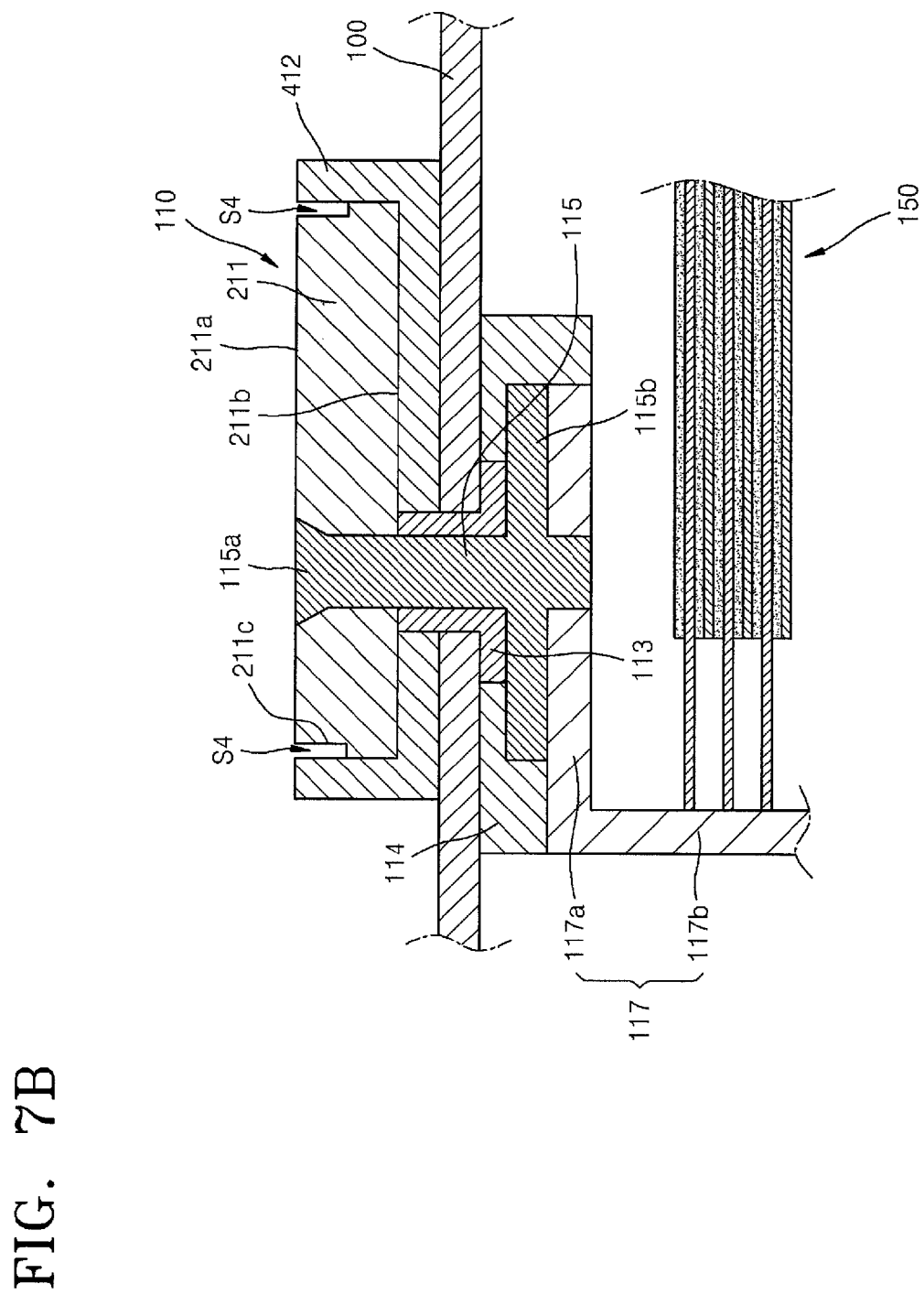

FIGS. 7A and 7B illustrate a short circuit preventing portion S4 according to another embodiment of present invention. FIG. 7B is a cross-sectional view of the secondary battery cut along a line VII-b of FIG. 7A.

Referring to FIGS. 7A and 7B, the short circuit preventing portion S4 is formed on a terminal plate 211. For example, the short circuit preventing portion S4 may be formed in a boundary area of the terminal plate 211 adjacent to an insulation member 412.

The short circuit preventing portion S4 may include a groove portion formed in the terminal plate 211. The short circuit preventing portion S4 may be formed in the form of a groove, which is capable of accommodating a flow of a foreign material, so as to block the flow of the foreign material that is about to flow from the terminal plate 211 to the insulation member 412. Accordingly, an electrical short circuit due to the flow of the foreign material flowing from the terminal plate 211 onto the cap plate 100 may be blocked.

The short circuit preventing portion S4 may be formed to a depth extending from an exposed upper surface 211a of the terminal plate 211 toward a lower surface 211b facing the cap plate 100, and may be formed along a side surface 211c of the terminal plate 211. According to another embodiment of the present invention, the short circuit preventing portion S4 may be formed to a depth to pass through the terminal plate 211, that is, up to the lower surface 211b of the terminal plate 211.

The short circuit preventing portion S4 may be selectively formed in a portion along a boundary of the terminal plate 211 or may be formed in the form of a closed loop along the entire boundary of the terminal plate 211. For example, as illustrated in FIG. 7A, the terminal plate 211 may have a rectangular shape including a pair of short side portions and a pair of long side portions, or the short circuit preventing portion S4 may be selectively formed on one pair of short side portions. However, the short circuit preventing portion S4 according to the embodiments of the present invention is not limited thereto, and may also be formed in the form of a closed loop along the rectangular boundary of the terminal plate 211.

At least two of the short circuit preventing portions S1, S2, and S3 having different forms illustrated in FIGS. 4A, 5A, and 6A may be formed in combination on one of the insulation members 112, 212, and 312. FIGS. 8A, 8B, 9, 10, 11A, and 11B respectively illustrate insulation members 512, 612, 712, and 812 according to embodiments of the present invention. Hereinafter, a structure in which at least two different short circuit preventing portions among short circuit preventing portions S21, S22, S31, S32, S41, S42, S51, S52, and S53 are combined on one insulation member will be described with reference to FIGS. 8A, 8B, 9, 10, 11A, and 11B.

Figure 8A:
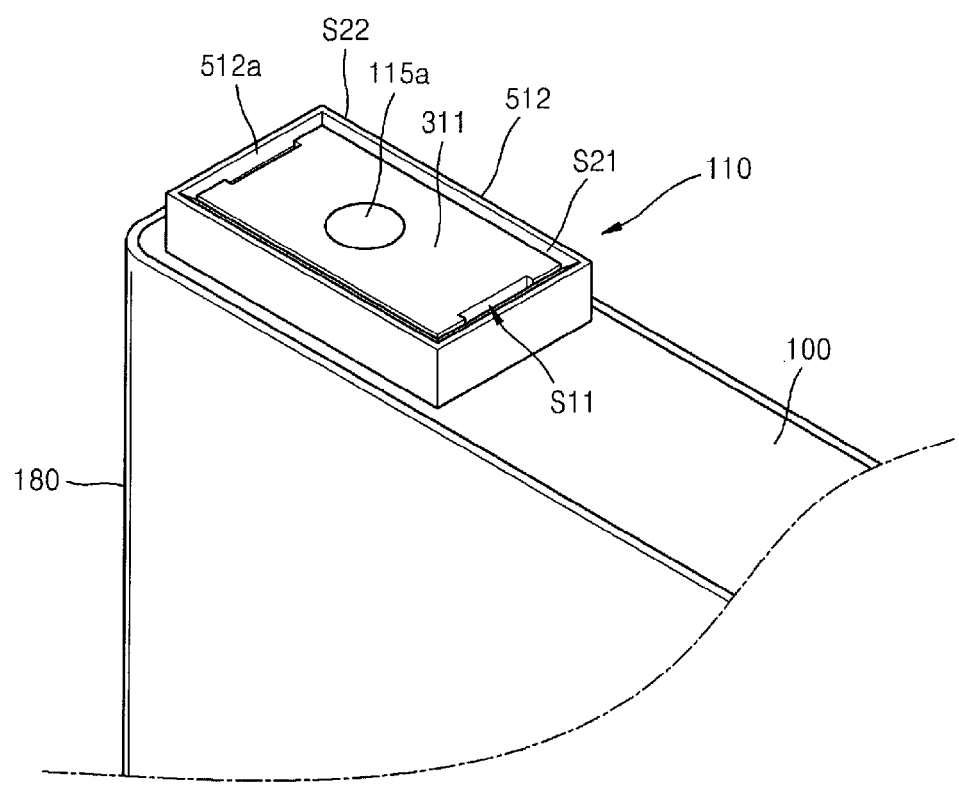
FIGS. 8A and 8B illustrate a portion of a secondary battery including an insulation member according to another embodiment of the present invention.
Figure 8B:
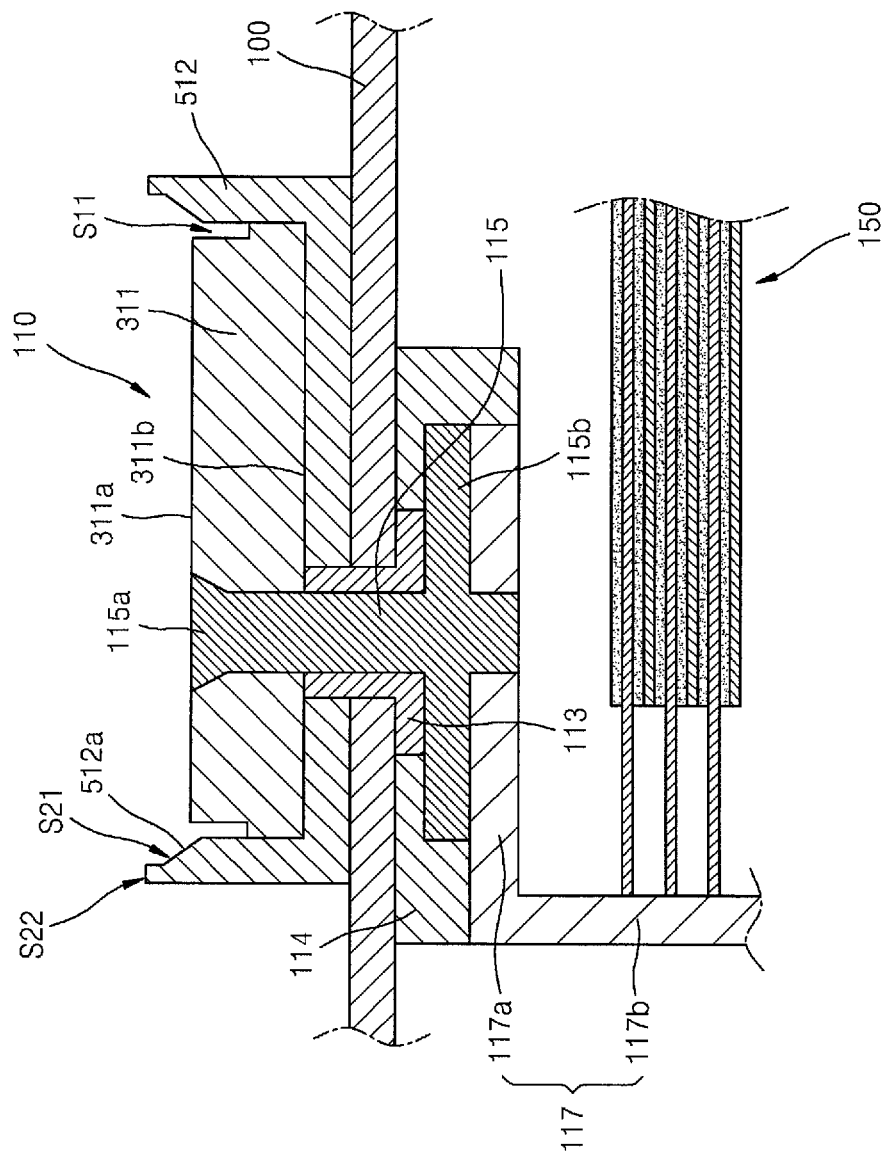

FIGS. 8A and 8B illustrate an insulation member 512 according to an embodiment of the present invention. FIG. 8B is a cross-sectional view of FIG. 8A.

Short circuit preventing portions S21 and S22 illustrated in FIGS. 8A and 8B may comprise a first short circuit preventing portion S21 having an inclined upper surface 512a and a second short circuit preventing portion S2 in the form of a protrusion protruded from the upper surface 512a of the insulation member 512. For example, a flow of a foreign material may be limited within a terminal plate 311 via the inclined surface of the first short circuit preventing portion S21 and the protrusion of the second short circuit preventing portion S22, and the flow of the foreign material to an outer portion of the terminal plate 311 may be blocked.

Figure 9:
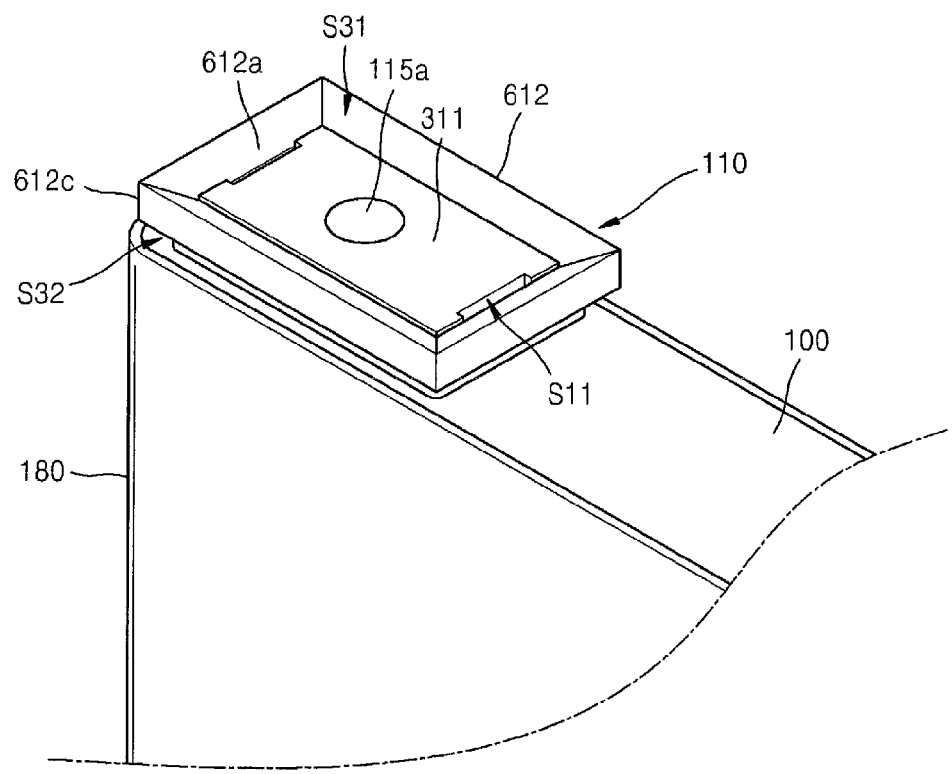
FIGS. 9 and 10 illustrate a portion of a secondary battery including an insulation member according to another embodiments of the present invention.

FIG. 9 illustrates an insulation member 612 according to another embodiment of the present invention.

Short circuit preventing portions S31 and S32 illustrated in FIG. 9 may comprise a first short circuit preventing portion S31 having an inclined upper surface 612a and a second short circuit preventing portion S32 having a stepped side surface 612c. For example, a flow of a foreign material may be limited within a terminal plate 311 via the inclined surface of the first short circuit preventing portion S31, and even if the foreign material flows along the side surface 612c of the insulation member 612, a continuous flow of the foreign material may be blocked via the stepped side surface 612c of the second short circuit preventing portion S32.

Figure 10:
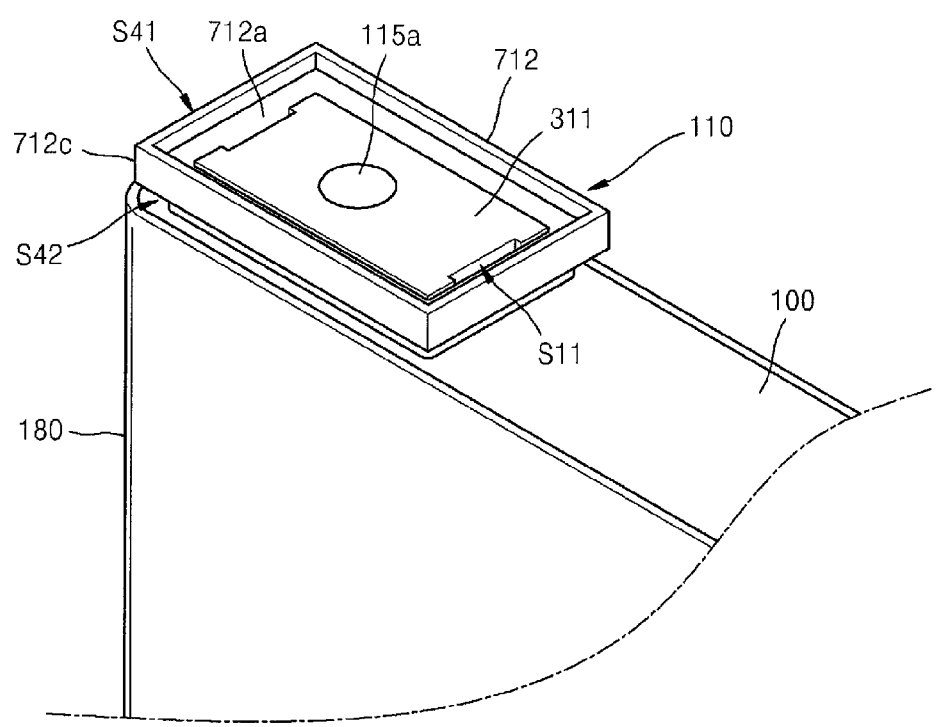

FIG. 10 illustrates an insulation member 712 according to another embodiment of the present invention.

Short circuit preventing portions S41 and S42 illustrated in FIG. 10 may comprise a first short circuit preventing portion S41 in the form of a protrusion protruding from an upper surface 712a of the insulation member 712 and a second short circuit preventing portion S42 having a stepped side surface 712c. For example, a flow of a foreign material may be limited within a terminal plate 311 via the protrusion of the first short circuit preventing portion S41, and even if the foreign material flows along a side surface of the insulation member 712, a continuous flow of the foreign material may be blocked via the stepped side surface 712c of the second short circuit preventing portion S42.

Figure 11A:
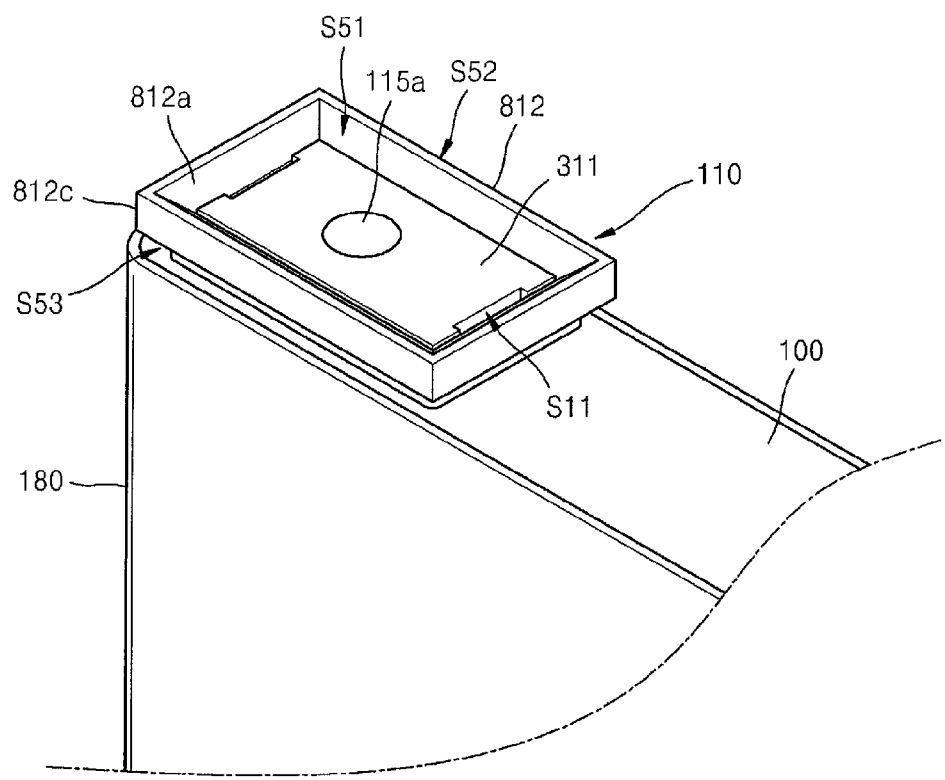
FIGS. 11A and 11B illustrate a portion of a secondary battery including an insulation member according to another embodiment of the present invention.
Figure 11B:
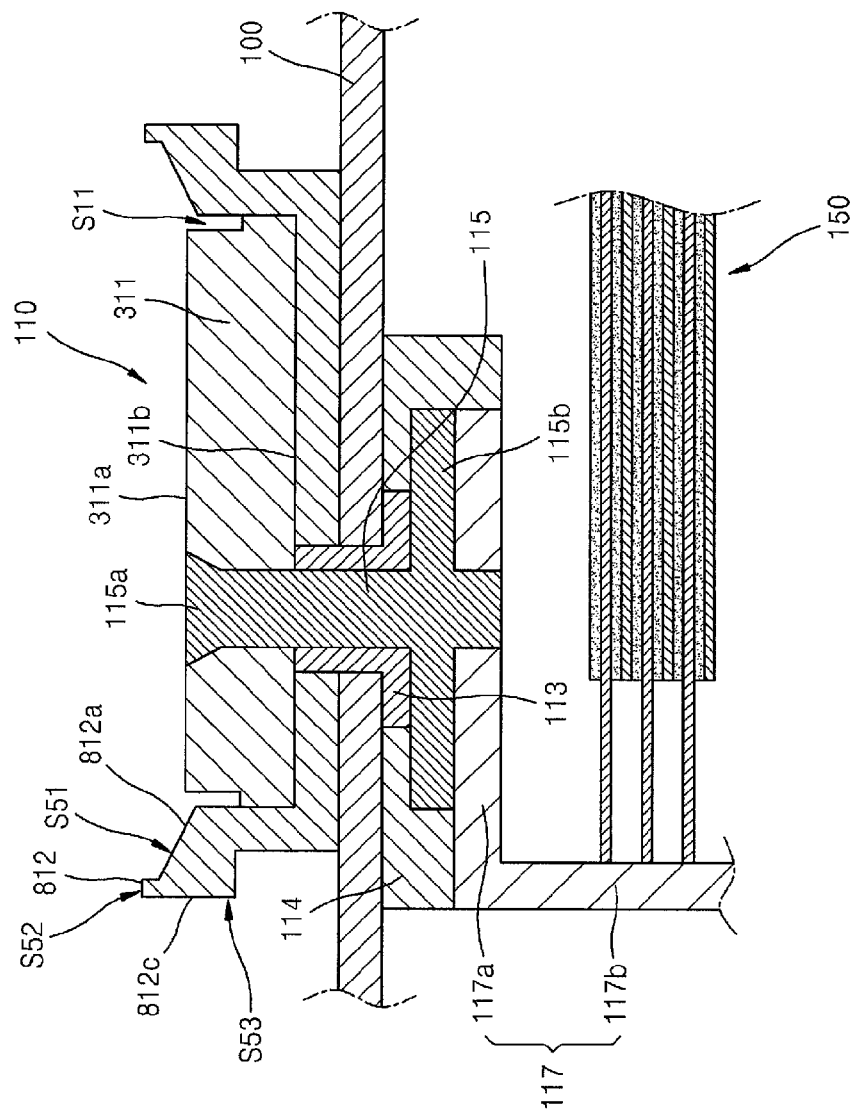

FIGS. 11A and 11B illustrate an insulation member 812 according to another embodiment of the present invention. FIG. 11B is a cross-sectional view of the insulation member 812 of FIG. 11A.

Short circuit preventing portions S51, S52, and S53 illustrated in FIGS. 11A and 11B may comprise a first short circuit preventing portion S51 having an inclined upper surface 812a, a second short circuit preventing portion S52 in the form of a protrusion protruding from the upper surface 812a of the insulation member 812, and a third short circuit preventing portion S53 having a stepped side surface 812c. For example, a flow of a foreign material may be limited within a terminal plate 311 via the inclined upper surface 812a of the first short circuit preventing portion S51 and the protrusion of the second short circuit preventing portion S52, and even if the foreign material flows along the side surface 812c of the insulation member 812, a continuous flow of the foreign material may be blocked via the stepped side surface 812c of the third short circuit preventing portion S53.

In one embodiment, the secondary batteries illustrated in FIGS. 8A, 8B, 9, 10, 11A, and 11B may further include a short circuit preventing portion S11 of the terminal plate 311 in addition to the short circuit preventing portions S21, S22, S31, S32, S41, S42, S51, S52, and S53 of the insulation members 512, 612, 712, and 812.

That is, according to the embodiments illustrated in FIGS. 8A, 8B, 9, 10, 11A, and 11B, the short circuit preventing portions S11, S21, S22, S31, S32, S41, S42, S51, S52, and S53 may comprise the short circuit preventing portions S11 formed on the terminal plate 311 and the short circuit preventing portions S21, S22, S31, S32, S41, S42, S51, S52, and S53 formed on the insulation members 512, 612, 712, and 812. In each of the embodiments of the present invention, the short circuit preventing portion S11 which is in the form of a groove formed on the terminal plate 311 may provide accommodation space for accommodating a flow of a foreign material in the terminal plate 311, and as the flow of the foreign material from the terminal plate 311 toward the insulation members 512, 612, 712, and 812 is accommodated, the flow of the foreign material flowing along the cap plate 100 is blocked via the short circuit preventing portion S11. Consequently, an electrical short circuit between the terminal plate 311 and the cap plate 100 may be prevented. Moreover, as the short circuit preventing portions S21, S22, S31, S32, S41, S42, S51, S52, and S53 are further formed on the insulation members 512, 612, 712, and 812 which surrounds the terminal plate 311, the flow of the foreign material flowing along the insulation members 512, 612, 712, and 812 may be blocked, and a short circuit between the terminal plate 311 and the cap plate 100 may be prevented.

For example, according to the embodiment illustrated in FIGS. 8A and 8B, the short circuit preventing portions S11, S21, and S22 may comprise a first short circuit preventing portion S21 having the inclined upper surface 512a of the insulation member 512, a second short circuit preventing portion S22 in the form of a protrusion protruding from the upper surface 812a of the insulation member 812, and a third short circuit preventing portion S11 in the form of a groove portion formed in the terminal plate 311. The third short circuit preventing portion S11 may be formed to a predetermined depth from an upper surface 311a of the terminal plate 311.

For example, according to the embodiment of FIG. 9, the short circuit preventing portions S11, S21, and S22 may comprise a first short circuit preventing portion S21 having the inclined upper surface 512a of the insulation member 512, a second short circuit preventing portion S22 in the form of a protrusion protruding from the upper surface 812a of the insulation member 812, and a third short circuit preventing portion S11 in the form of a groove portion formed in the terminal plate 311.

For example, according to the embodiment of FIG. 10, the short circuit preventing portions S11, S41, and S42 may comprise a first short circuit preventing portion S41 in the form of a protrusion protruding from the upper surface 712a of the insulation member 712 and a second short circuit preventing portion S42 having the stepped side surface 712c of the insulation member 712, and a third short circuit preventing portion S11 in the form of a groove portion formed in the terminal plate 311.

For example, according to the embodiment of FIGS. 11A and 11B, the short circuit preventing portions S11, S51, S52, and S53 may comprise a first short circuit preventing portion S51 having the inclined upper surface 812a of the insulation member 812, a second short circuit preventing portion S52 in the form of a protrusion protruding from the upper surface 812a of the insulation member 812, and a third short circuit preventing portion S11 having the stepped side surface 812c, and a fourth short circuit preventing portion S11 in the form of a groove portion formed in the terminal plate 311.

In one embodiment, while not shown in the drawings, the short circuit preventing portions S1, S2, and S3 of the insulation members 112, 212, and 312 illustrated in FIGS. 4A, 5A, and 6A and the short circuit preventing portion S4 of the terminal plate 211 illustrated in FIG. 7A may be applied in combination to a single secondary battery, and illustration and description of detailed structures thereof will be omitted here.

In one embodiment, according to an embodiment of the present invention, the first terminal plates 111, 211, and 311 and the cap plate 100 have different polarities, and the second terminal plate 121 and the cap plate 100 may have the same polarity. Accordingly, the short circuit preventing portions S21, S22, S31, S32, S41, S42, S51, S52, and S53 may be formed on the first terminal plate 111, 211, and 311 and/or the insulation members 112, 212, 312, 412, 512, 612, 712, and 812 surrounding the first terminal plate 111, 211, and 311, thereby preventing an electrical short circuit between the first terminal plate 111, 211, and 311 and the cap plate 100. In this case, as the second terminal plate 121 and the cap plate 100 have the same polarity, a short circuit preventing portion may be omitted in the second terminal plate 121.

According to another embodiment of the present invention, the first terminal plate 111, 211, and 311 and the second terminal plate 121 may both have a different polarity from the cap plate 100. Here, the short circuit preventing portion S1, S2, S3, S4, S11, S21, S22, S31, S32, S41, S42, S51, S52, and S53 may be formed on the first terminal plate 111, 211, and 311 in order to prevent an electrical short circuit between the first terminal plate 111, 211, and 311 and the cap plate 100. In addition, another short circuit preventing portions S1, S2, S3, S4, S11, S21, S22, S31, S32, S41, S42, S51, S52, and S53 may be formed on the second terminal plate 121 in order to prevent an electrical short circuit between the second terminal plate 121 and the cap plate 100. That is, a pair of short circuit preventing potions S1, S2, S3, S4, S11, S21, S22, S31, S32, S41, S42, S51, S52, and S53 may be formed on the first and second terminal plates 111, 211, 311, and 212. The pair of the short circuit preventing potions S1, S2, S3, S4, S11, S21, S22, S31, S32, S41, S42, S51, S52, and S53 formed on the first and second terminal plates 111, 211, 311, and 212 may have various structures as described above, and the pair of the short circuit preventing potions S1, S2, S3, S4, S11, S21, S22, S31, S32, S41, S42, S51, S52, and S53 may have the same structure or different structures.

It should be understood that the exemplary embodiments described therein should be considered in a descriptive sense only and not for purposes of limitation. Descriptions of features or aspects within each embodiment should typically be considered as available for other similar features or aspects in other embodiments.

| Explanation of Reference numerals | |
|---|---|
| 100: cap plate | 110: first electrode terminal |
| 111, 211, 311: first terminal plate | 121: second terminal plate |
| 112, 212, 312, 412, 512, 612, 712, 812: insulation member | |
| 113, 123: seal gasket | |
| 114, 124: lower insulation member | 115, 125: collector terminal |
| 115a, 125a: collector terminal fixing portion | 115b, 125b: collector terminal flange portion |
| 117, 127: collector member | 117a, 127a: lead portion |
| 117b, 127b: collector plate | 150: electrode assembly |
| 151: first electrode plate | 152: second electrode plate |
| 153: separator | 120: second electrode terminal |
| H1: height of terminal plate | H2: height of short circuit preventing portion |
| S1, S2, S3, S4, S11, S21, S22, S31, S32, S41, S42, S51, S52, S53: short circuit preventing portion | |

What is claimed is:

1. A secondary battery comprising:
an electrode assembly;
a case accommodating the electrode assembly;
a cap plate extending in a first plane and sealing the electrode assembly within the case;
a terminal plate on the cap plate and electrically connected to the electrode assembly; and
an insulation member between and contacting the cap plate and the terminal plate, wherein the insulation member has a peripheral flange that extends away from the terminal plate in the first plane, the flange being spaced from the cap plate such that an open gap is located between the flange and the cap plate, wherein no material is located in the open gap.

2. The secondary battery of claim 1, wherein the peripheral flange creates a stepped outer periphery of the insulation member.

3. The secondary battery of claim 1, wherein the peripheral flange extends around an entire periphery of the insulation member.

4. The secondary battery of claim 1, wherein the peripheral flange protrudes past an upper surface of the terminal plate.

5. The secondary battery of claim 1, wherein an upper surface of the insulation member is inclined downwardly toward the terminal plate.

6. The secondary battery of claim 1, wherein a portion of the terminal plate is spaced from the insulation member to define a groove between the terminal plate and the insulation member.

7. The secondary battery of claim 1, wherein an end of the peripheral flange is a free end that does not contact any other component of the secondary battery.

8. The secondary battery of claim 1, wherein an upper surface of the insulation member is flush with or recessed from an upper surface of the terminal plate.

9. The secondary battery of claim 1, wherein the peripheral flange protrudes away from a side surface and an upper surface of the insulating member.

10. The secondary battery of claim 9, wherein a portion of the terminal plate is spaced from the insulation member to define a groove between the terminal plate and the insulation member.

11. A secondary battery comprising:
an electrode assembly;
a case accommodating the electrode assembly;
a cap plate sealing the electrode assembly within the case;
a terminal plate on the cap plate and electrically connected to the electrode assembly; and
an insulation member between the cap plate and the terminal plate, wherein a portion of the terminal plate is spaced from the insulation member to provide an open gap between the terminal plate and the insulation member, wherein no material is located in the open gap.

12. The secondary battery of claim 11, wherein the open gap extends only partially between the insulation member and the terminal plate.

13. The secondary battery of claim 11, wherein the insulation member has an inner peripheral surface inclined towards the terminal plate.

14. The secondary battery of claim 13, wherein the inclined inner peripheral surface extends to the groove.

15. The secondary battery of claim 11, wherein an upper surface of the insulation member protrudes past an upper surface of the terminal plate.

16. The secondary battery of claim 11, wherein the insulation member comprises a flange extending away from the terminal plate to create a stepped outer periphery of the insulation member.

17. A secondary battery comprising:
an electrode assembly;
a case accommodating the electrode assembly;
a cap plate sealing the electrode assembly within the case;
a terminal plate on the cap plate and electrically connected to the electrode assembly; and
an insulation member between and contacting the cap plate and the terminal plate, wherein the insulation member has a side wall extending away from the cap plate and along the terminal plate, the side wall having a sloped end surface wherein the sloped end surface is directly adjacent to the terminal plate.

18. The secondary battery of claim 17, wherein the end surface of the insulation member is inclined sloped downwardly towards the terminal plate.

19. The secondary battery of claim 17, wherein the end surface of the insulation member protrudes past an upper surface of the terminal plate.

20. The secondary battery of claim 17, wherein the insulation member comprises a flange extending away from the terminal plate to define a stepped outer periphery of the insulation member.

* * * * *